United States Patent
Assouline et al.

[11] 3,803,408
[45] Apr. 9, 1974

[54] IMAGE CONVERTER

[75] Inventors: Georges Assouline; Eugene Leiba; Erich Spitz, all of Paris, France

[73] Assignee: Thomson-CSF, Paris, France

[22] Filed: Jan. 15, 1973

[21] Appl. No.: 323,358

Related U.S. Application Data

[63] Continuation of Ser. No. 43,427, June 4, 1970, abandoned.

[30] Foreign Application Priority Data
June 11, 1969   France ................................ 69.19329

[52] U.S. Cl........ 250/213 R, 250/331, 350/160 LC, 23/230 LC
[51] Int. Cl. ................................................. G02f 1/18
[58] Field of Search ........ 250/213 VT, 331; 313/91, 313/92; 350/160 LC; 23/230 LC; 178/7.7

[56] References Cited
UNITED STATES PATENTS

| | | | |
|---|---|---|---|
| 3,401,262 | 9/1968 | Fergason et al. ............... | 250/213 X |
| 3,499,112 | 3/1970 | Heilmeier et al. .................. | 178/7.7 |
| 3,322,485 | 5/1967 | Williams ....................... | 350/160 LC |
| 2,892,380 | 6/1959 | Baumann et al. .............. | 250/213 X |
| 3,627,408 | 12/1971 | Fergason ...................... | 250/213 VT |
| 3,503,672 | 3/1970 | Marlowe ....................... | 350/160 LC |
| 3,503,673 | 3/1970 | Heilmeier et al. ............. | 360/160 LC |

OTHER PUBLICATIONS

Heilmeier et al.: Dynamic Scattering, Proceedings of the IEEE, Vol. 56; No. 7; July, 1968; pp. 1162–1171.

*Primary Examiner*—Walter Stolwein
*Attorney, Agent, or Firm*—Cushman, Darby & Cushman

[57] ABSTRACT

An image converter comprising, between two transparent electrodes connected to a d.c. supply source, a layer of nematic liquid crystal and a layer of photoconductive material located against each other. An image to be converted is projected onto the photoconductive layer and the liquid crystal layer is illuminated by an auxiliary light source.

5 Claims, 5 Drawing Figures

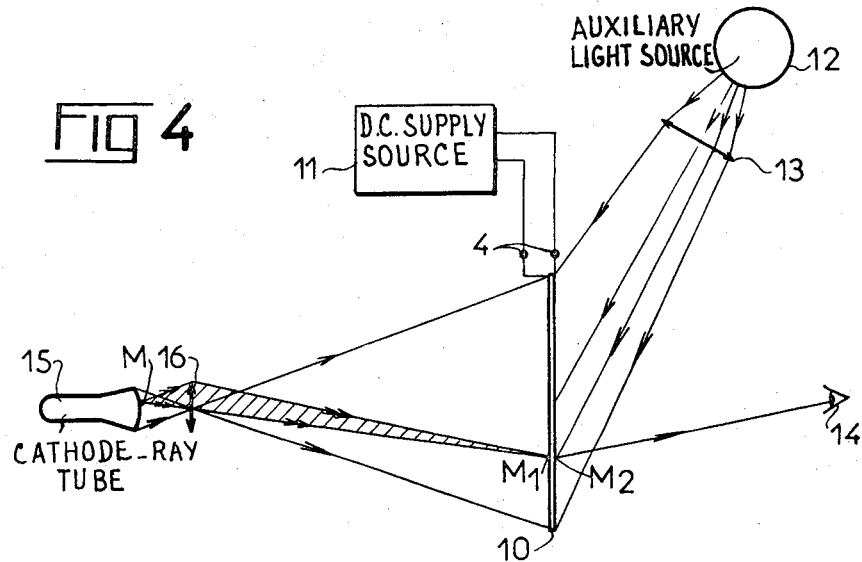
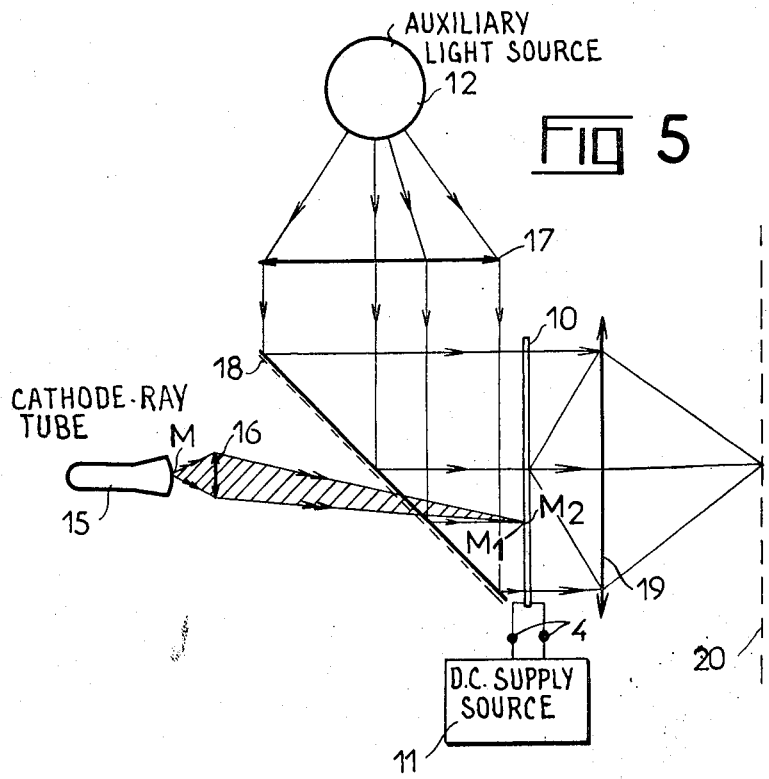

IMAGE CONVERTER

This is a continuation, of application Ser. No. 43,427 filed June 4, 1970 now abandoned.

The present invention relates to a liquid crystal image converter.

Liquid crystals are substances which, in a certain temperature range, exhibit in thin layers, different specific arrangements of elongated molecules according to whether they are smectic, cholesteric or nematic crystals. It is nematic liquid crystals which are used in the present instance. The molecules of these liquid crystals, in the nematic state, have their axes parallel to each other but can slide in relation to one another. In the rest condition, bodies of this kind are transparent but, when an electric field is applied to them, turbulence is produced in the liquid which results in a diffusion of the light passing through it, this diffusion being the more marked the stronger the applied field. This phenomenon is described in more detail in a paper by G.H. Heilmeier, L.A. Zanoni and L.A. Barton, which appeared in the "Proceedings of the IEEE", vol. 56, No. 7, July 1968, Page 1162 to 1171 under the heading "Dynamic Scattering: A new electrooptic effect in certain classes of nematic liquid crystal".

It is an object of this invention to make use of this phenomenon to provide an arrangement capable of converting any image into another image, for example a visible image, which may be much brighter and/or larger in size.

According to the invention, there is provided an image converter for converting a first image into a second image comprising: a constant-thickness layer of photoconductive material; a constant-thickness layer of nematic liquid crystal located against said photoconductive layer; two transparent electrodes for enclosing said two layers; means for connecting said electrodes to a supply; means for projecting said first image onto said photo-conductive layer; and optical means for illuminating substantially uniformly said liquid crystal layer.

For a better understanding of the invention and to show how the same may be carried into effect, reference will be made to the drawing accompanying the ensuing description and in which:

FIG. 1 schematically illustrates the converter in accordance with the invention;

FIG. 4 illustrates diagrammatically an application of the converter in accordance with the invention; and FIG. 5 illustrates diagrammatically a modification of the application of FIG. 4.

Figure 1:
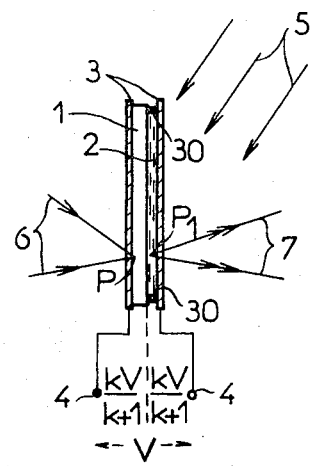

In FIG. 1, between two flat, parallel and transparent electrodes 3, there are arranged a thin film of a photoconductive body 1, for example such as those used in vidicon tubes, such as selenium, antimony trisulfide, lead oxide and so on, or a photo-conductor sensitive to ultra-violet light, such as zinc sulfide, and a thin film of a nematic liquid crystal 2. The layer 2 is applied to a flat face of the photo-conductor layer 1 whose thickness is selected in the manner to be described hereinafter. Spacers 30, for example of PTFE, e.g. the product marketed under the name of "Teflon", ensure an appropriate spacing between one of the electrodes 3 and the photo-conductive film 1, thus leaving the requisite space for the layer 2 of liquid crystal. The capillary forces suffice to maintain the layer of liquid crystal between the electrode 3 and the photo-conductor layer 1, whatever the orientation of the arrangement.

A d.c. voltage V is applied between terminals 4 connected to the electrodes 3. The layer of liquid crystal is obliquely and substantially uniformly illuminated by an auxiliary light source which produces a radiation 5 which is not absorbed by the photo-conductor. Under the effect of the illumination of a region P of the photo-conductor layer 1, by a radiation 6 to which this photo-conductor is sensitive, the region $P_1$ of the liquid crystal layer 2 disposed opposite, will diffuse the received radiation 5, in the manner which will be explained in more detail hereinafter.

The operation of the arrangement is as follows. It will be described with particular reference to FIG. 2.

Figure 2:
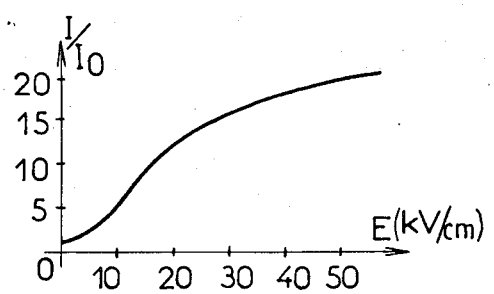
FIG. 2 is an explanatory graph.

A liquid crystal in the nematic state has, as mentioned hereinbefore, the property of diffusing light passing through it, if an adequately strong electric field is also applied to it. FIG. 2 shows the form of the graph representing the variation in the diffused luminous intensity I as compared to the diffused intensity $I_o$ with no electric field applied as a function of the electric field strength E applied to the liquid crystal (this graph has been plotted for $C_1$ — anisylidene-p-aminophenylacetate as the liquid crystal). The liquid crystal begins to diffuse from a certain field strength value (in this case around 5 kV/cm), and thereafter diffusion increases with the field strength until a saturation level is reached (in this case this is attained at a field strength in the order of 50 kV/cm).

If a voltage V is applied across the terminals 4, and if the thickness of the layers 1 and 2 and the resistivities thereof for a given uniform illumination of the photoconductor are such that the ratio between the impedances of the layers 1 and 2 is equal to $k$, then the voltage between the two faces of the liquid crystal layer 2 will be given by $V/(k+1)$, whilst the voltage between the two faces of the layer 1 will be $(kV)/(k+1)$.

If k is made to vary by modifying the illumination of the photo-conductor (and this modifies its impedance of course), the voltage $V/(k+1)$ will be varied and therefore the electric field applied to the liquid crystal.

The voltage V applied to the image converter in accordance with the invention and the respective thicknesses of the layers 1 and 2 are selected as a function of the respective resistivities of the liquid crystal and the photoconductor, so that when the photo-conductor is in darkness (i.e. is not illuminated by any radiation of the kind to which it is sensitive), the impedances of the two layers 1 and 2 are such that the field applied to the liquid crystal is insufficient to generate the phenomenon of light scattering The radiation 5 (FIG. 1) thus passes through the liquid crystal without being diffused and, for an observer located opposite the liquid crystal layer, the converter in accordance with the invention will behave as a mirror in substantially the same way as the screen of an inoperative cathode ray tube, because of the fact that the face of the photoconductive layer carrying the liquid crystal is smooth.

When a region P of the photo-conductor is illuminated by a radiation to which it is sensitive, the impedance of the photo-conductive layer in this region decreases, reducing the ratio $k$ there. The voltage across the terminals of region $P_1$ of the liquid crystal which is opposite the region P, that is to say the voltage $V/(k+1)$, will accordingly rise. The region $P_1$ which is subjected to a stronger field, therefore begins to diffuse and appears to the observer as a luminous region emitting a radiation 7. Since the major part of the light diffused by the liquid crystal is diffused in the direction of the photo-conductor layer, it is desirable that the latter should have as highly polished a face as possible in order to reflect forward the light which is diffused towards the rear, and thus reinforce the intensity of the light transmitted towards the observer. The intensity of the beam of light diffused by a region such as $P_1$, will be the higher, and consequently said region $P_1$ will appear the brighter, the lower the impedance of the photo-conductor in the region P and the more brightly region P is illuminated.

If a light image is projected onto the photo-conductive layer 1, a spatial modulation of the impedance of the photo-conductor takes place and, consequently, the image is reproduced by the liquid crystal layer. The brightness of the reproduced image depends upon the intensity of the auxiliary light beam 5 and, since the photo-conductor is sensitive even to low illumination levels, it is possible to obtain from an image of low luminous intensity, a much brighter image, so that the image converter in accordance with the invention also operates as a brightness amplifier.

In order to be able to exploit the whole range of variation in intensity of the light diffused by the liquid crystal, that is to say in order to obtain as full as possible a grey scale, it is necessary that the field applied to the liquid crystal should be capable of varying in a ration of 10. To this end, as calculation shows, it is necessary that the ratio k, when the photo-conductor is in darkness, should be in the same order (about 10). If the resistivity of the liquid crystal, which is generally in the order of $10^{10} \Omega cm$, and that of the photo-conductor when in the dark state, are in the same order, then the thickness of the photo-conductive layer will have to be about ten times that of the liquid crystal layer.

Of course, it is essential for the liquid crystal used to be maintained in its nematic state. It is therefore necessary to maintain it within a given temperature range which will vary in accordance with the particular crystal used. If necessary, it is possible to provide a temperature stabilizing system by which to heat (for example through radiation) or cool the converter in accordance with the invention. If the liquid crystal used is in the nematic state at ambient temperature, then of course such a system will not be required.

In a specific embodiment, a liquid crystal layer of the kind referred to hereinbefore with reference to the graph of FIG. 2, has been used, which had a thickness of $10\mu$. This layer is perfectly transparent when the voltage between its faces is in the order of 3 V, and becomes fully diffusive at a voltage in the order of 30 V. If the thickness of the photo-conductive layer (zinc sulfide for example) is made such that, when the photo-conductor is not illuminated by a kind of radiation which it can absorb (for example ultra-violet), the ratio k of the impedances is equal to 9, then by selecting a voltage V of 30 V, the voltage applied to the liquid crystal will be 3 V and the crystal layer will appear to be black. The impedance of the photo-conductive layer is in the order of several tens of megohms.

If the photo-conductive layer is illuminated by radiation of the kind which it can absorb and whose intensity is such that the impedance of the photo-conductor is divided by 10, then the voltage applied across the liquid crystal will be equal to 16 V and the liquid crystal layer will become diffusive and present a grey appearance.

If the illumination level is such that the impedance of the photo-conductive layer is divided by 100, then the voltage applied across the liquid crystal will be equal to 28 V and the liquid crystal layer will produce the diffusing effect and present a white appearance, it being assumed of course that the layer is illuminated with white light.

At this juncture, however, the following important observation should be made: in all the foregoing explanations, it has been assumed that the photo-conductor does not absorb the radiation 5 and that its impedance is therefore not affected by this radiation. This is the case with zinc sulfide which does not absorb white light but is sensitive to radiation 6 with a high ultra-violet content.

If, on the other hand, a photo-conductor which is sensitive to visible radiation is used, then it is necessary to isolate the photo-conductor layer from the radiation 5, which is generally in the visible part of the spectrum if it is desired to observe directly the image produced by the image converter in accordance with the invention.

Figure 3:
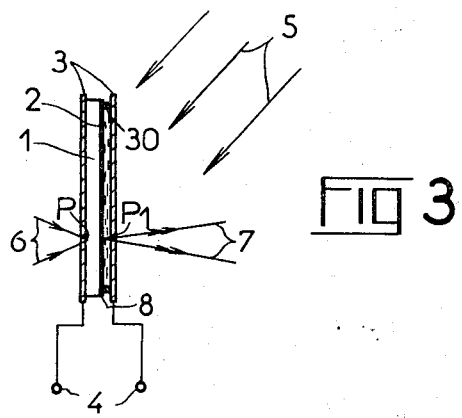
FIG. 3 illustrates a variant embodiment of the converter in accordance with the invention.

For this purpose, the variant embodiment of FIG. 3 is used.

The illumination 6 of the photo-conductive layer 1, is effected with visible light, as in the case of the illumination 5. However, there is placed between the liquid crystal layer 2 and the photo-conductive layer 1, an opague screen 8. This screen 8 can, for example, be a very thin layer of carbon black.

In FIG. 4, an application of the converter in accordance with the invention to a large-screen projection system, has been illustrated. More particularly, by means of this system it is possible to obviate the necessity of using large-screen cathode-ray tubes which are bulky and furthermore require a substantial power supply.

In this application, a small-size cathode-ray tube 15 is used. The image displayed upon the screen of the tube 15 is projected by means of a short focal length objective lens 16 onto the photo-conductive layer of a screen 10 of larger dimensions designed in the manner indicated in FIGS. 1 or 3. A direct voltage source 11 is connected across the terminals 4 which are in turn connected to the electrodes of the screen 10. An auxiliary light source 12 obliquely illuminates the liquid crystal layer through the medium of a lens 13. Observation is effected at 14 either by a human observer or by using any suitable optical viewing or pick-up system. There corresponds to any luminous point M of the screen of the tube 15, an impedance drop in the photo-conductor at the point $M_1$, which is the image of the point M, and a corresponding point $M_2$ of the liquid crystal diffuses the auxiliary light towards the observer, appearing as a luminous region on the screen 10.

In this fashion, brightness amplification of the image can be effected. Of course, if necessary the voltage produced by the source 11 can be regulated in order to obtain a better image.

In describing the converter in accordance with the invention, only the case in which the image is furnished by reflection of the auxiliary light, has been considered. However, it is self-evident that, for example by choosing a photo-conductor which does not absorb visible light, it is possible to illuminate the liquid crystal with visible light through the thin photo-conductor layer and the transparent electrodes, and then to observe the transmitted light.

It is upon this principle that the variant embodiment of a large-screen projector, shown in FIG. 5, is based. Similar reference numerals refer here to elements identical to those similarly marked in FIG. 4. Illumination by the visible light source 12, of the liquid crystal layer of the screen 10, is effected through the photo-conductive layer, for example zinc sulfide, through the medium of the collimating lens 17 and the semi-transparent mirror 18. An objective lens 19 projects the image of the screen 10 onto a projection screen 20. Because of the fact that the photo-conductor selected does not absorb the light furnished by the source 12, this light is normally transmitted fully, without diffusion by the liquid crystal, since the electric field is applied almost exclusively to the high-impedance photo-conductor. The image of a light spot M on the screen of the tube 15, the latter having been chosen to produce light which has a particularly high ultra-violet content, is formed at $M_1$ on the photo-conductive layer of the screen 10. At this point, the impedance of the photo-conductor reduces radically as a consequence, and the electric field applied to the liquid crystal at $M_2$, increases. The region $M_2$ therefore diffuses the light and the intensity of the transmitted light reduces. A bright spot on the screen of the tube 15 will therefore appear as a dark spot on the projection screen 20. If it is desired to obtain a positive image upon the screen 10, obviously, all that is necessary is to produce a negative image on the screen of the tube 15 and this can be achieved, for example, by reversing the polarity of the signals applied to the cathode-ray tube 15.

Because of the brightness amplification achieved by the converter in accordance with the invention, it is possible to obtain upon the projection screen 20 an image of very high quality.

Of course, the invention is not limited to the embodiments described and shown which were given solely by way of example. In particular infra-red or ultra-violet images can be converted into visible images, by an appropriate choice of the photo-conductor body.

What is claimed is:

1. An image converter for converting a first image into a second image comprising: a constant-thickness layer of photo-conductive material; a constant-thickness layer of nematic liquid crystal located against said photo-conductive layer; and two transparent electrodes for enclosing said two layers; said liquid crystal layer having a voltage threshold above which dynamic scattering is produced; said image converter further comprising means for connecting said electrodes to a voltage source delivering a voltage higher than said voltage threshold; means for projecting said first image onto said photo-conductive layer; and optical means for illuminating substantially uniformly said liquid crystal layer; said first image causing the voltage drop across said liquid crystal layer to exceed said voltage threshold, thereby providing a diffusing second image.

2. An image converter as claimed in claim 1, wherein said optical means comprise an auxiliary source located for illuminating said liquid crystal layer from the side at which said liquid crystal layer is observed.

3. An image converter as claimed in claim 2, wherein a thin screen layer, electrically conductive and opaque to the radiations supplied by said auxiliary source is placed between said photo-conductive and said liquid crystal layers.

4. An image converter as claimed in claim 3, wherein said screen layer is a layer of carbon black.

5. An image converter as claimed in claim 1, wherein said optical means comprise an auxiliary source located for illuminating said liquid crystal layer through said photo-conductive layer, said photo-conductive layer and the radiations supplied by said auxiliary source being so selected that said photo-conductive layer does not substantially absorb said radiations.

* * * * *